(12) United States Patent
Kalyuzhny

(10) Patent No.: US 10,108,856 B2
(45) Date of Patent: Oct. 23, 2018

(54) DATA ENTRY FROM SERIES OF IMAGES OF A PATTERNED DOCUMENT

(71) Applicant: ABBYY Development LLC, Moscow (RU)

(72) Inventor: Aleksey Ivanovich Kalyuzhny, Moscow Oblast (RU)

(73) Assignee: ABBYY Development LLC, Moscow (RU)

( * ) Notice: Subject to any disclaimer, the term of this patent is extended or adjusted under 35 U.S.C. 154(b) by 126 days.

(21) Appl. No.: 15/195,603

(22) Filed: Jun. 28, 2016

(65) Prior Publication Data

US 2017/0330030 A1 Nov. 16, 2017

Related U.S. Application Data

(63) Continuation-in-part of application No. 15/168,548, filed on May 31, 2016, and a continuation-in-part of application No. 15/168,525, filed on May 31, 2016.

(30) Foreign Application Priority Data

May 13, 2016 (RU) ................................ 2016118633
May 13, 2016 (RU) ................................ 2016118635
Jun. 24, 2016 (RU) ................................ 2016125289

(51) Int. Cl.
*G06K 9/00* (2006.01)
*G06K 9/62* (2006.01)
*G06T 7/70* (2017.01)
*G06K 9/46* (2006.01)

(52) U.S. Cl.
CPC ...... *G06K 9/00442* (2013.01); *G06K 9/00449* (2013.01); *G06K 9/00483* (2013.01); *G06K 9/4604* (2013.01); *G06K 9/6218* (2013.01); *G06T 7/70* (2017.01)

(58) Field of Classification Search
CPC .......... G06K 9/00442; G06K 9/00449; G06K 9/00483; G06K 9/4604; G06K 9/6218; G06T 7/70
See application file for complete search history.

(56) References Cited

U.S. PATENT DOCUMENTS

| 5,159,548 | A | 10/1992 | Caslavka |
| 6,470,336 | B1 * | 10/2002 | Matsukawa ....... G06F 17/30011 |
| 8,595,235 | B1 * | 11/2013 | Sampson ........... G06K 9/00483 707/737 |
| 8,724,907 | B1 * | 5/2014 | Sampson ............ G06K 9/6255 382/209 |

(Continued)

OTHER PUBLICATIONS

Abdulkader et al. "Low cost correction of OCR errors using learning in a multi-engine environment." Document Analysis and Recognition, 2009. ICDAR'09. 10th International Conference on. IEEE, 2009.*

(Continued)

*Primary Examiner* — Katrina Fujita
(74) *Attorney, Agent, or Firm* — Lowenstein Sandler LLP

(57) ABSTRACT

The present disclosures provide methods of optical character recognition for extracting information from a patterned document, which have at least static element and at least one information field. Related computer systems and computer-readable non-transitory storage media are also disclosed.

25 Claims, 6 Drawing Sheets

(56) References Cited

U.S. PATENT DOCUMENTS

Figure 1:
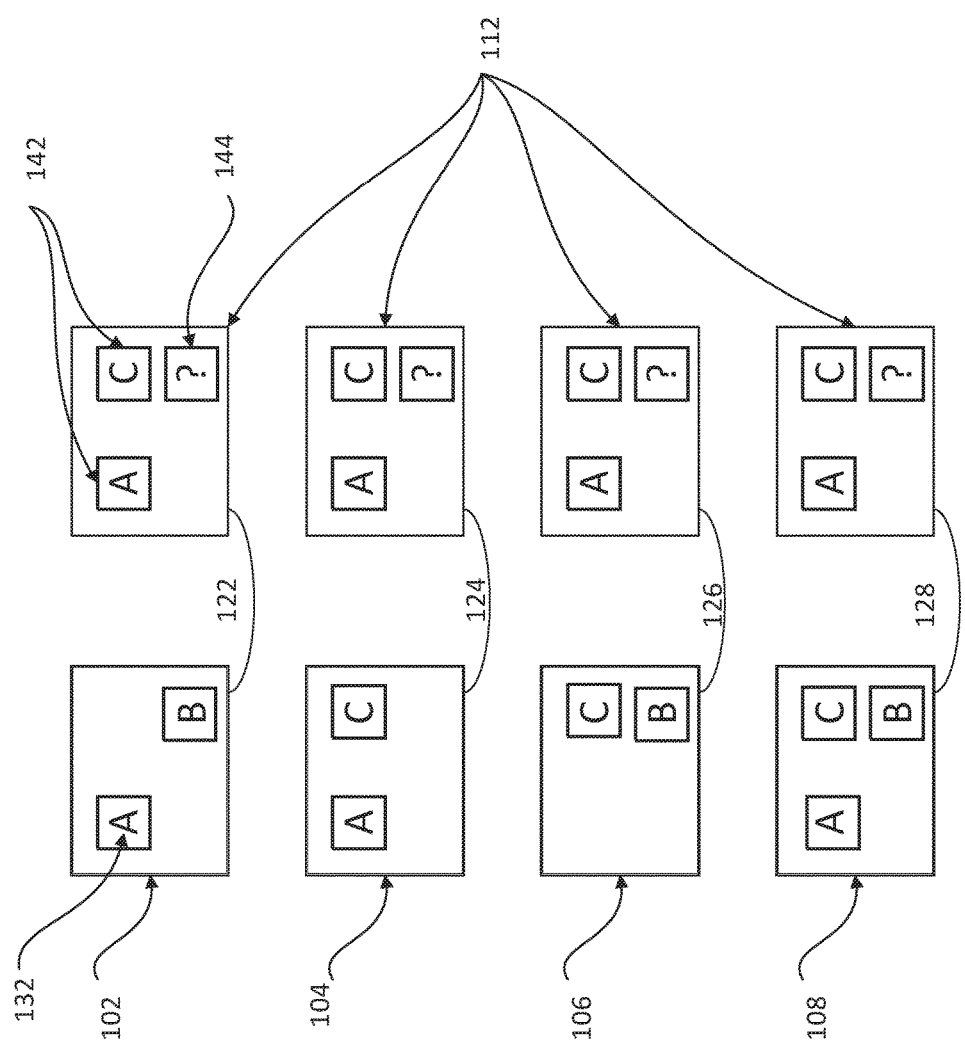

| | | | |
|---|---|---|---|
| 8,787,660 B1* | 7/2014 | Simon | G06K 9/6828 |
| | | | 345/468 |
| 8,832,108 B1* | 9/2014 | Sampson | G06K 9/00463 |
| | | | 707/737 |
| 8,843,494 B1* | 9/2014 | Sampson | G06K 9/00463 |
| | | | 707/737 |
| 8,880,540 B1* | 11/2014 | Sampson | G06K 9/00463 |
| | | | 707/756 |
| 8,995,774 B1 | 3/2015 | van Deventer et al. | |
| 9,069,768 B1* | 6/2015 | Sampson | G06F 17/30705 |
| 9,396,540 B1* | 7/2016 | Sampson | G06F 17/30244 |
| 2006/0050962 A1* | 3/2006 | Geiger | G06K 9/00872 |
| | | | 382/186 |
| 2008/0154848 A1* | 6/2008 | Haslam | G06F 17/30011 |
| 2013/0108160 A1* | 5/2013 | Yamazoe | G06K 9/723 |
| | | | 382/177 |
| 2015/0317530 A1* | 11/2015 | Aizawa | G06F 17/30967 |
| | | | 382/182 |
| 2015/0324639 A1 | 11/2015 | Macciola | |
| 2016/0086320 A1* | 3/2016 | Fujisawa | G06T 7/001 |
| | | | 382/141 |
| 2016/0300116 A1* | 10/2016 | Yasunaga | G06K 9/325 |

OTHER PUBLICATIONS

Rusiñol et al. "Symbol spotting in vectorized technical drawings through a lookup table of region strings." Pattern Analysis and Applications 13.3 (2010): 321-331.*

* cited by examiner

DATA ENTRY FROM SERIES OF IMAGES OF A PATTERNED DOCUMENT

CROSS REFERENCE TO RELATED APPLICATIONS

The present Application claims the benefit of priority under 35 USC 119 to Russian Patent Application No. 2016125289, filed Jun. 24, 2016, Russian Patent Application No. 2016118635, filed May 13, 2016 and Russian Patent Application No. 2016118633, filed May 13, 2016; the present Application is also a Continuation-In-Part of U.S. patent application Ser. Nos. 15/168,548 and 15/168,525, both filed on May 31, 2016; disclosure of priority applications are incorporated herein by reference in their entirety for all purposes.

FIELD

The present disclosure relates generally to computer systems and methods, and, more specifically, to systems and methods for optical character recognition (OCR), including OCR systems and methods for extracting information from structured (fixed) documents.

BACKGROUND

Optical character recognition (OCR) is a computer-implemented conversion of text images (including typed, handwritten, or printed text) into computer-encoded electronic documents.

SUMMARY

One embodiment is a method, comprising: (a) receiving, by a processing device of a computer system, a current image of a series of images of a copy of a patterned document, wherein the patterned document has at least one static element and at least one information field; (b) performing optical character recognition (OCR) of the current image to produce an OCR text and corresponding coordinates for each symbol of the OCR text; (c) identifying parameters of a coordinate transformation to transform coordinates of the current image into coordinates of a template, wherein the template contains i) a text and coordinates for the at least one static element of the patterned document and ii) coordinates for the at least one information field of the patterned document; (d) identifying in the OCR text for the current image in the coordinate system of the template a text fragment that corresponds to an information field of the at least one information field; (e) associating in the coordinate system of the template the text fragment that corresponds to the information field with one or more clusters of symbol sequences, wherein the text fragment is produced by processing the current image and wherein the symbol sequences are produced by processing one or more previously received images of the series of images; (f) producing, for each cluster of the one or more clusters, a median string representing the cluster of symbol sequences for the information field; and (g) producing, using the median string of each of the one or more clusters, a resulting OCR text that represents an original text of the information field of the copy of the patterned document.

Another embodiment is a method, comprising: (a) receiving, by a processing device of a computer system, a current image of a series of images of a copy of a patterned document, wherein the current image at least partially overlaps with a previous image of the series of images and the patterned document has at least one static element and at least one information field; (b) performing optical symbol recognition (OCR) of the current image to produce an OCR text and corresponding coordinates for each symbol of the OCR text; (c) identifying parameters of a coordinate transformation to transform coordinates of the previous image into coordinates of the current image; (d) associating at least part of the OCR text with one or more clusters of symbol sequences, wherein the OCR text is produced by processing the current image and wherein the symbol sequences are produced by processing one or more previously received images of the series of images; (e) identifying parameters of a coordinate transformation to transform the coordinates of the current image of the series of images, into coordinates of a template of the patterned document, wherein the template contains i) a text and coordinates for the at least one static element of the patterned document and ii) coordinates for the at least one information field of the patterned document; (f) identifying in the coordinate system of the template, one or more clusters of symbol sequences that corresponds to an information field of the at least one information field; (g) producing, for each of the one or more clusters that corresponds to the information field, a median string representing the cluster of symbol sequences for the information field; and (h) producing, using the median string of each of the one or more clusters, a resulting OCR text that represents an original text of the information field of the copy of the patterned document.

Another embodiment is a system, comprising: A) a memory configured to store a template of a patterned document, which comprises at least one static element and at least one information field, wherein the template contains i) a text and coordinates for the at least one static element of the patterned document and ii) coordinates for the at least one information field of the patterned document; B) a processing device, coupled to the memory, the processing devise configured to: (a) receive a current image of a series of images of a copy of the patterned document; (b) perform optical character recognition (OCR) of the current image to produce an OCR text and corresponding coordinates for each symbol of the OCR text; (c) identify parameters of a coordinate transformation to transform coordinates of the current image into coordinates of the template; (d) identify in the OCR text for the current image in the coordinate system of the template a text fragment that corresponds to an information field of the at least one information field; (e) associate in the coordinate system of the template the text fragment that corresponds to the information field with one or more clusters of symbol sequences, wherein the text fragment is produced by processing the current image and wherein the symbol sequences are produced by processing one or more previously received images of the series of images; (f) produce, for each cluster of the one or more clusters, a median string representing the cluster of symbol sequences for the information field; and (g) produce, using the median string of each of the one or more clusters, a resulting OCR text that represents an original text of the information field of the copy of the patterned document.

Another embodiment is a system, comprising: A) a memory configured to store a template of a patterned document, which comprises at least one static element and at least one information field, wherein the template contains i) a text and coordinates for the at least one static element of the patterned document and ii) coordinates for the at least one information field of the patterned document; B) a processing device, coupled to the memory, the processing devise configured to: (a) receive a current image of a series of images of a copy of the patterned document; (b) perform optical symbol recognition (OCR) of the current image to produce an OCR text and corresponding coordinates for each symbol of the OCR text; (c) identify parameters of a coordinate transformation to transform coordinates of the previous image into coordinates of the current image; (d) associate at least part of the OCR text with one or more clusters of symbol sequences, wherein the OCR text is produced by processing the current image and wherein the symbol sequences are produced by processing one or more previously received images of the series of images; (e) identify parameters of a coordinate transformation to transform the coordinates of the current image of the series of images, into coordinates of the template; (f) identify in the coordinate system of the template, one or more clusters of symbol sequences that corresponds to an information field of the at least one information field; (g) produce, for each of the one or more clusters that corresponds to the information field, a median string representing the cluster of symbol sequences for the information field; and (h) produce, using the median string of each of the one or more clusters, a resulting OCR text that represents an original text of the information field of the copy of the patterned document.

Yet another embodiment is a computer-readable non-transitory storage medium comprising executable instructions that, when executed by a processing device, cause the processing device to: (a) receive a current image of a series of images of a copy of a patterned document, wherein the patterned document has at least one static element and at least one information field; (b) perform optical character recognition (OCR) of the current image to produce an OCR text and corresponding coordinates for each symbol of the OCR text; (c) identify parameters of a coordinate transformation to transform coordinates of the current image into coordinates of a template, wherein the template contains i) a text and coordinates for the at least one static element of the patterned document and ii) coordinates for the at least one information field of the patterned document; (d) identify in the OCR text for the current image in the coordinate system of the template a text fragment that corresponds to an information field of the at least one information field; (e) associate in the coordinate system of the template the text fragment that corresponds to the information field with one or more clusters of symbol sequences, wherein the text fragment is produced by processing the current image and wherein the symbol sequences are produced by processing one or more previously received images of the series of images; (f) produce, for each cluster of the one or more clusters, a median string representing the cluster of symbol sequences for the information field; and (g) produce, using the median string of each of the one or more clusters, a resulting OCR text that represents an original text of the information field of the copy of the patterned document.

And yet another embodiment is a computer-readable non-transitory storage medium comprising executable instructions that, when executed by a processing device, cause the processing device to: (a) receive a current image of a series of images of a copy of a patterned document, wherein the current image at least partially overlaps with a previous image of the series of images and the patterned document has at least one static element and at least one information field; (b) perform optical symbol recognition (OCR) of the current image to produce an OCR text and corresponding coordinates for each symbol of the OCR text; (c) identify parameters of a coordinate transformation to transform coordinates of the previous image into coordinates of the current image; (d) associate at least part of the OCR text with one or more clusters of symbol sequences, wherein the OCR text is produced by processing the current image and wherein the symbol sequences are produced by processing one or more previously received images of the series of images; (e) identify parameters of a coordinate transformation to transform the coordinates of the current image of the series of images, into coordinates of a template of the patterned document, wherein the template contains i) a text and coordinates for the at least one static element of the patterned document and ii) coordinates for the at least one information field of the patterned document; (f) identify in the coordinate system of the template, one or more clusters of symbol sequences that corresponds to an information field of the at least one information field; (g) produce, for each of the one or more clusters that corresponds to the information field, a median string representing the cluster of symbol sequences for the information field; and (h) produce, using the median string of each of the one or more clusters, a resulting OCR text that represents an original text of the information field of the copy of the patterned document.

FIGURES

FIG. 1 schematically illustrates matching of optical character recognition (OCR) results for each of images 102, 104, 106, and 108 of a series of images of a patterned document with template 112 of the patterned document.

Figure 2:
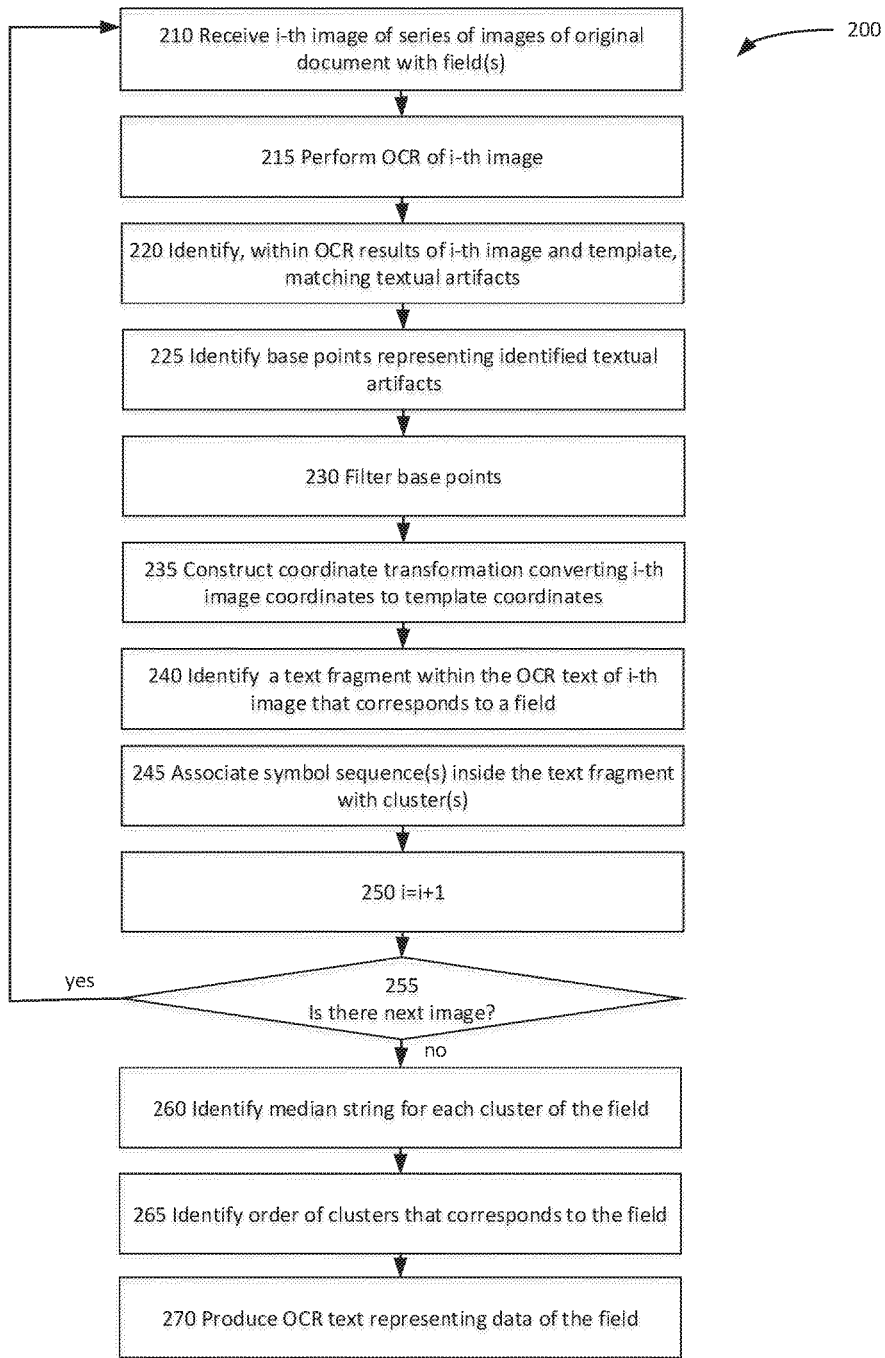

FIG. 2 presents a block diagram of one illustrative example of a method of automated data extraction from one or more information fields of a patterned document using a series of images of the document.

Figure 3:
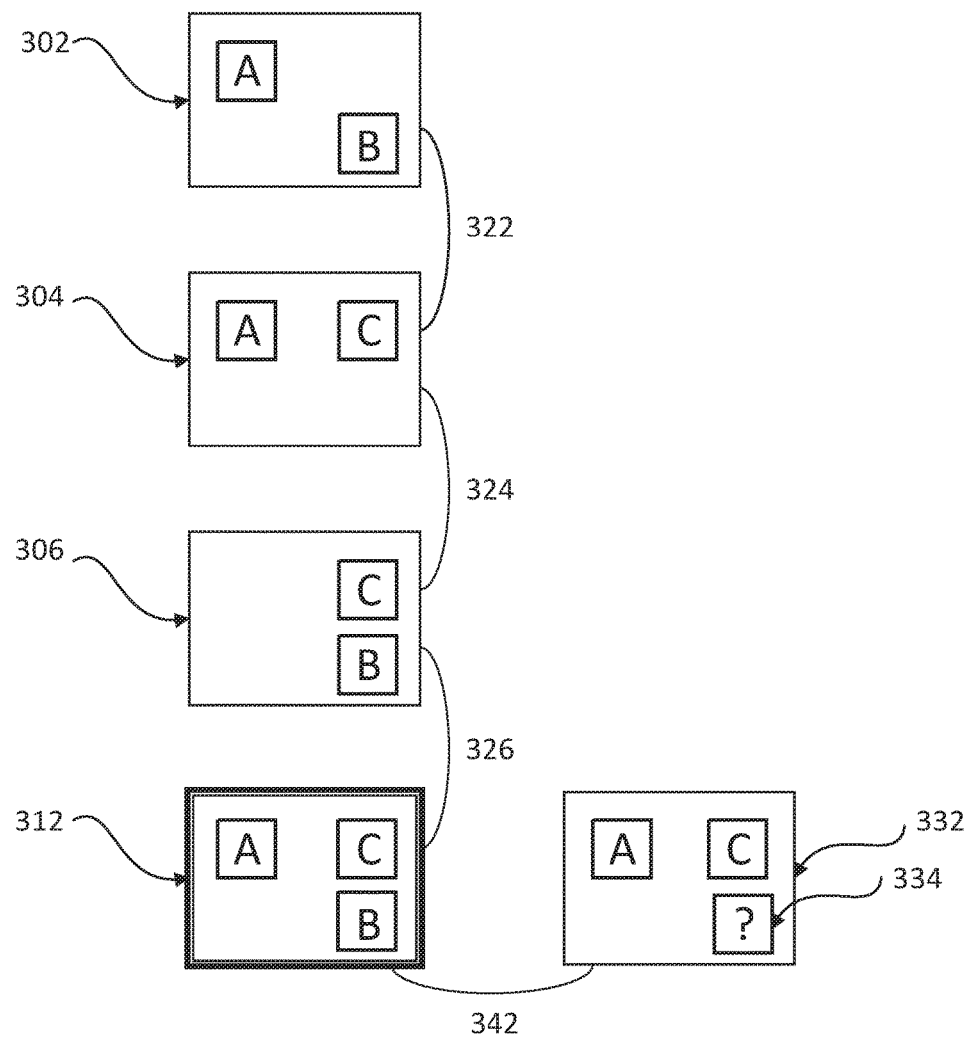

FIG. 3 schematically illustrates matching OCR results for pairs of images for a sequence of images of a patterned document and a subsequent matching of combined OCR result for the sequence of images of the patterned document with a template of the patterned document.

Figure 4:
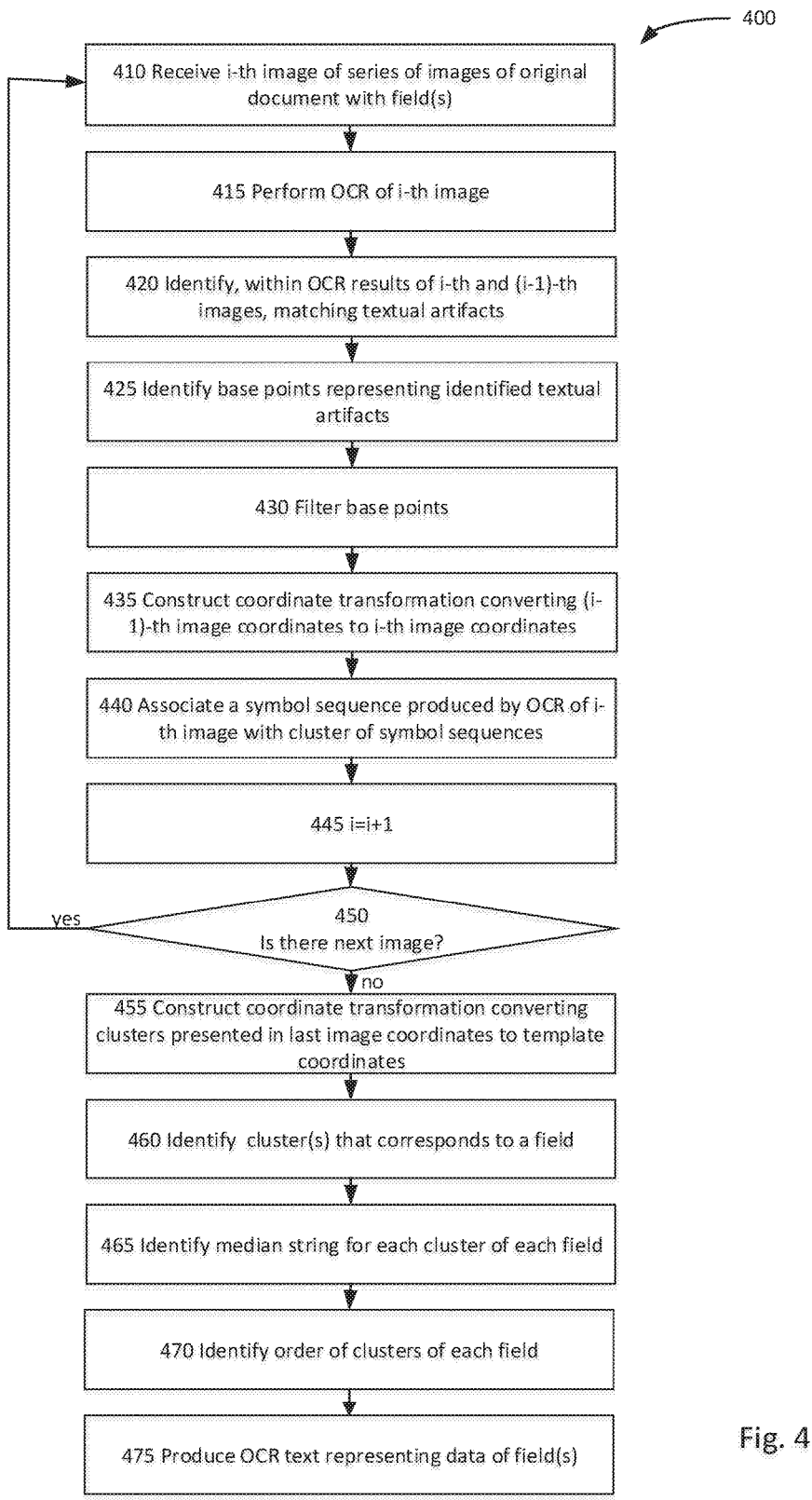

FIG. 4 presents a block diagram of another illustrative example of a method of automated data extraction from one or more information fields of a patterned document using a series of images of the document.

Figure 5:
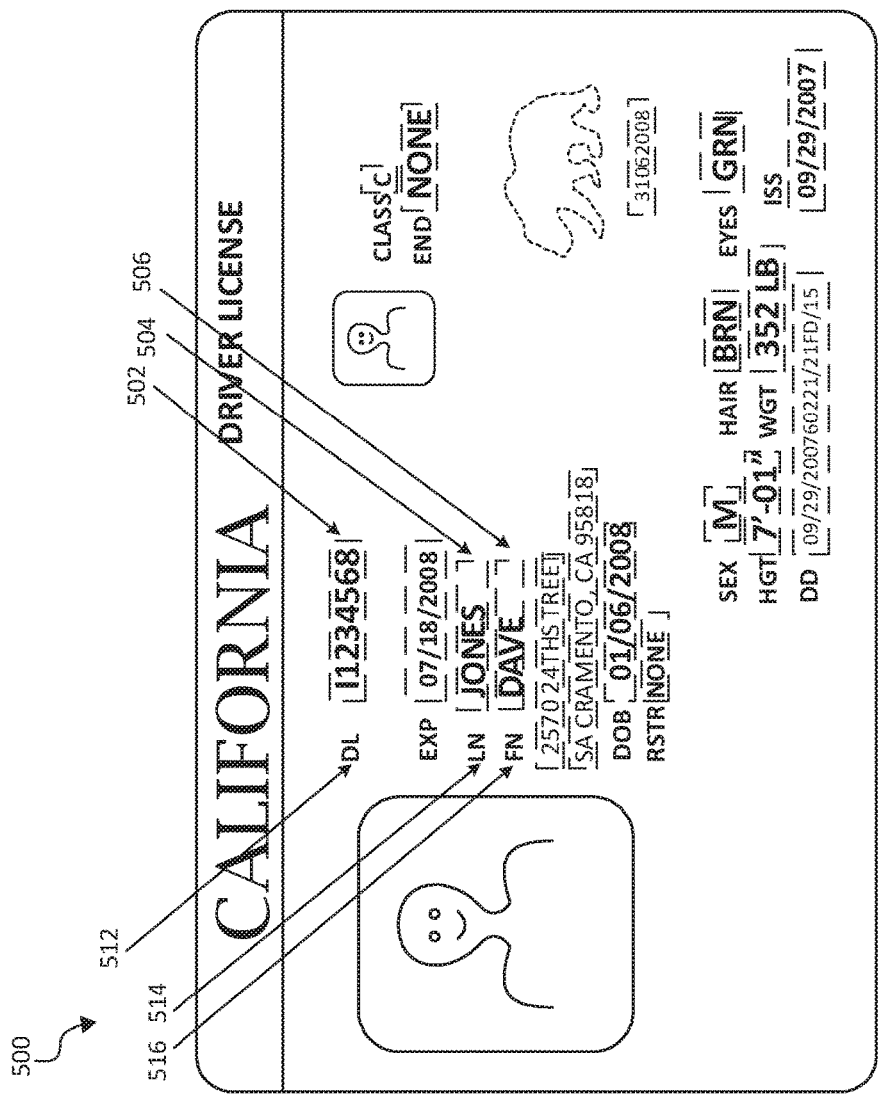

FIG. 5 schematically depicts a California driver license as an illustrative example of a patterned document, which has one or more static elements and one or more information fields.

Figure 6:
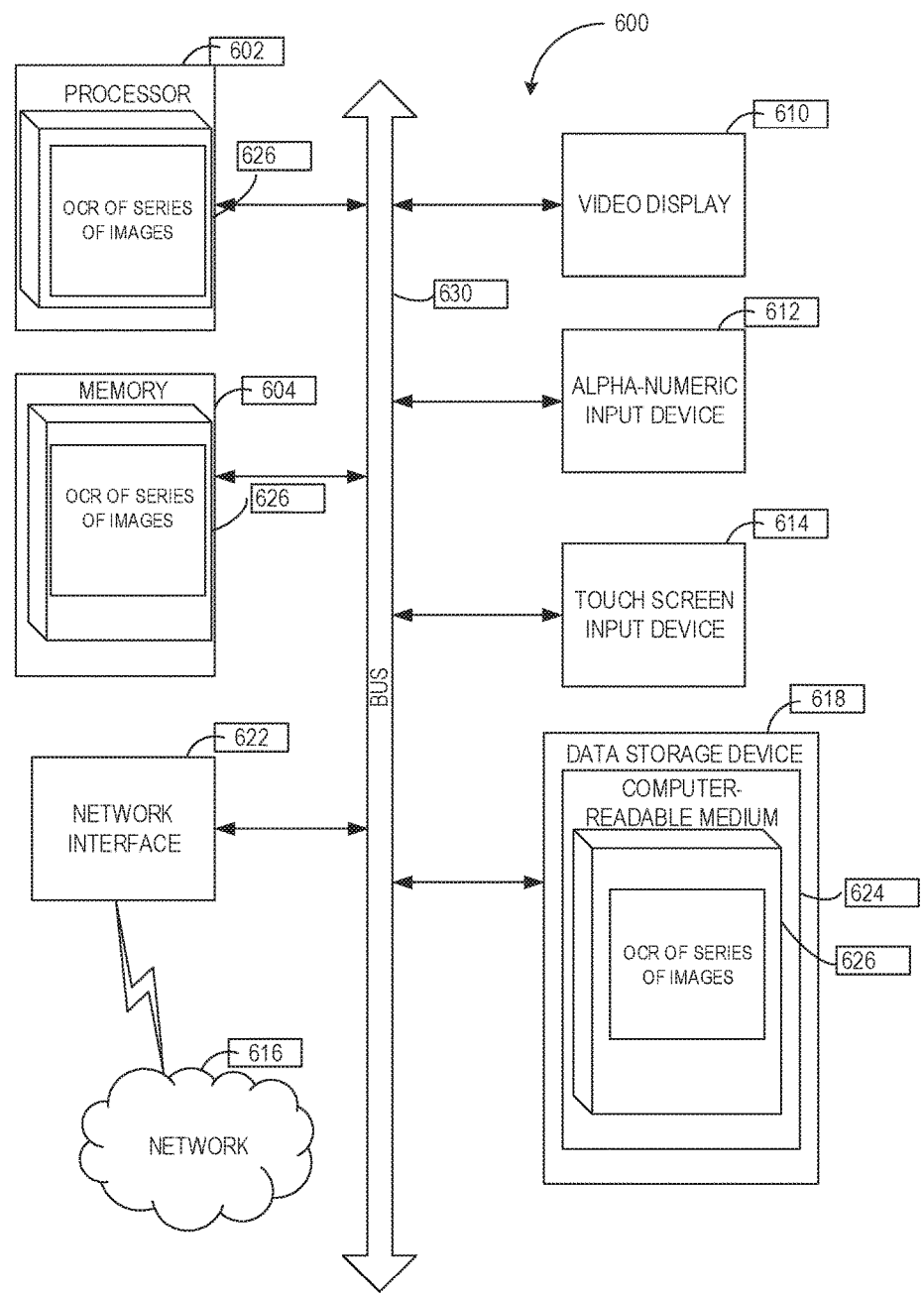

FIG. 6 schematically depicts a computer system, which may be used for implementing disclosed methods.

DETAILED DESCRIPTION

Related Documents

The following documents, which are incorporated herein by reference in their entirety, may be helpful for understanding the present disclosure: a) U.S. patent application Ser. No. 15/168,548 filed May 31, 2016; and b) U.S. patent application Ser. No. 15/168,525 filed May 31, 2016.

Disclosure

Described herein are methods and systems for performing optical character recognition (OCR) of a series of images depicting symbols of a certain writing system. The writing systems whose symbols may be processed by the systems and methods described herein include alphabets that have separate symbols, or glyphs, representing individual sounds, as well as hieroglyphic writing systems that have separate symbols representing larger units, such as syllables or words.

The disclosed methods may be particularly useful for optical character recognition from patterned documents. In some embodiments, the disclosed methods allow an automatic entry of data from information fields of physical copies of documents, such as paper copies of documents, into informational systems and/or data bases using a computer system, which is equipped with or connected to a camera. In certain embodiments, the computer system may be a mobile device, such as a tablet, a cellular phone or a personal digital assistant, which is equipped with a camera. In some embodiments, the automatic data entry may performed in an online regime. Most or all steps of the disclosed methods may be performed directly by the computer system, such as a mobile device.

Existing methods of data extraction from paper documents, such as ABBYY FlexiCapture, usually use only a single image of a document. The single image may contain one or more defects, such as a digital noise, poor focusing or image clarity, glares, etc. which may be routinely caused by the camera shake, inadequate illumination, incorrectly chosen shutter speed or aperture, and/or other conditions and attenuating circumstances. As the result, data extracted from the single image of the document may contain optical character recognition errors. Disclosed data extraction methods utilize a series of images of a document. Although an individual image of the series may contain one or more defects and therefore, corresponding OCR results (extracted data) for the individual image may contain errors, combining OCR results (extracted data) for multiple images of the series may significantly improve quality of extracted data compared to data, which was extracted using a single image of the document, due to reduction or elimination of statistical errors and filtering out of random events. Thus, disclosed data extraction methods may be extremely noise resistant so that random errors in recognizing individual character(s) in the document, which may occur for an individual image, do not affect a final result of optical character recognition and/or data extraction.

In some embodiments, from a user's point of view, a process of obtaining data from a document may be as follows. A user may start an application, which is based on one of the disclosed methods, on a computer system, such as a mobile device, and activate a regime of the application, which may start a process of obtaining of series of images of a document by a camera, which is either an integral part of the computer system or is connected to the computer system. In many embodiments of the disclosed methods, the computer system, such as a mobile device, does not store the obtained images in its memory. The activation of the regime may initiate obtaining and processing of images of the series by a processor of the computer system, such as a mobile device. In some embodiments, the user may select a portion of the document to be scanned by positioning a crosshair of a viewfinder, which may be shown on a screen of the computer system, on that portion of the document. For example, the user may position a crosshair of a viewfinder, which is shown a screen of a mobile device, on a desired portion of the document. Individual images of the series do not need to contain the whole document. Thus, in some embodiments, at least some individual images of the series may contain only portions of the document, while partially overlapping with each other. In some embodiments, the camera may be scanned over the document. Preferably, such scanning covers all fragments or portions of the document.

In many embodiments, the scanning may be performed manually by the user. The processor performing one of the disclosed methods may identify relevant information field (s), from which data/information/text should be obtained or extracted by the optical character recognition, in each of the obtained images of the series on an on-going basis. In an interface of the application, a result of such identification may be shown as follows: the processor performing one of the disclosed methods may communicate with a screen or display of the computer system to highlight on the screen or display an individual image's fragment, in which an information field has been identified, and to demonstrate to the user the obtained or extracted data/information/text in order to confirm their accuracy. The processor may also on the screen or display provide instructions to the user, in which direction the camera should be scanned for obtaining further images.

The term "patterned document" may refer to a document, which has the same unchanged pattern or layout among individual documents, which belong to a particular type of a patterned document. Examples of patterned documents include, but no limited to fill-in forms, such as application forms, questionnaires, invoices, identification documents, such as passports and driver's licenses. A patterned document usually includes one or more information fields. A quantity of information fields, their design and positions do not change among individual documents, which belong to the same type of a patterned document.

In some embodiments, a patterned document may have at least one static element and at least one information field. The term "static element" refers to an element, which remains unchanged, both in its content and its position, among individual documents, which belong to a particular type of a patterned document. The term "information field" refers to a field, which carries a distinct information for each individual document, which belongs to a particular type of a patterned document. FIG. 5 uses a California driver license as an example of a patterned document. In FIG. 5. elements 512, 514 and 516 are static as they present in all California's driver license having this particular pattern. On the other hand, elements 502, 504 and 506 represent information fields as they carry the information, which is individual for each particular driver's license. In some embodiments, an information field may have a corresponding static element, which may, for example, define a type of information presented in the information field. For example, in FIG. 5. each of information fields 502, 504 and 506 has a corresponding static element (512, 514, 516, respectively). In some embodiments, an information field may have no corresponding static element. In FIG. 5, a home address entry is an example of such information field.

The disclosed methods may utilize a template of a patterned document. The use of a template may allow for an automatic determination whether a processed document corresponds to a known type of a patterned document, for which a template is stored in a memory of a computer system, such as a mobile device. The use of template may also allow for a determination of a position of a current image (of the series of images) of a patterned document with respect to a template of the patterned document in a situation when the current image shows only a portion or a fragment of the patterned document.

A template of a patterned document may contain a) information, such as a textual content and a positional information, such as coordinates, for one or more static elements of the document and b) positional information, such as coordinates, for one or more information fields document. Preferably, the template contains information regarding the textual content and coordinates for each of the static elements of the document as well as coordinates for each of the information fields. Preferably, the template is not an image of a portion of the document but an image of the document as a whole.

A template of a patterned document may be obtained using a number of ways. For example, a template of a patterned document may be prepared from an electronic version of the patterned document. If an electronic version of a patterned document is not available, then a template may be prepared using optical character recognition techniques from a physical copy, such as a paper copy, of the patterned document. The copy of the patterned document for the template may be a blank copy of the patterned document, i.e. a copy of the patterned document with unfilled (containing no text/information) information field(s), or a filled copy of the patterned document, i.e. a copy of the patterned document with filled (containing a text/information) information field(s). In some embodiments, obtaining a template of a patterned document from a physical copy of the patterned document may involve: a) obtaining an image of the copy of the patterned document as a whole; b) performing optical character recognition (OCR) of the obtained image to obtain OCR results, which include an OCR text and its corresponding layout information, including coordinates for each symbol and group of symbols in the OCR text; c) determining from the OCR results coordinates for one or more information fields of the patterned documents. The determining in c) may involve identifying the one or more information fields in the OCR results. In some embodiments, such identifying may be performed manually. The identified field may be assigned a corresponding identification. For example, in FIG. 5, fields 502, 504 and 506 may be assigned identifications "driver license number," "last name" and "first name", respectively. For each new type of a patterned document, a template may be obtained from a first image of a copy of the pattered document processed by a computer system.

Method One

In one embodiment, an OCR method may involve a) comparing each image of a series of images of a copy of a patterned document with a template of the patterned document to identify a data stack (a cluster of symbol sequences), which corresponds to a particular information field of the patterned document; and b) identifying the best (the most accurate) OCR result of the series of images using a median string and a median permutation for clusters of symbol sequences, which were collected for different images of the series, for the particular information field of the patterned document.

FIG. 1 schematically matching or comparing of each image 102, 104, 106 and 108 of an image series for a copy of a patterned document with template 112 of the patterned document. For each image of the series, the optical character recognition (OCR) may provide an OCR text and its corresponding layout, including coordinates for each symbol of the OCR text. In FIG. 1 element 132 illustrates an OCR text for image 102. The template may include the following information: a text, which corresponds to one or more static elements, such as a title of the document, titles for corresponding information fields, examples of filling in information fields, etc., coordinates for each symbol of the one or more static elements and coordinates for one or more information fields. In FIG. 1 on template 112, elements 142 illustrate static elements, while element 144 illustrates an information field. Matching or comparing an image of the series with the template may involve a projective transformation for each image of the series/template pair. FIG. 1 shows such projective transformations as elements 122, 124, 126 and 128.

FIG. 2 presents a flow chart of one illustrative example of a method for optical character recognition for a series of images of a patterned document. The method and/or each of its individual functions, routines, subroutines, or operations may be performed by one or more processors of a computer system executing the method. In some embodiments, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. Therefore, while FIG. 2 and the associated description lists the operations of method 200 in certain order, various implementations of the method may perform at least some of the described operations in parallel and/or in arbitrary selected orders.

For clarity and conciseness, the present description assumes that the processing of each image of a patterned document is initiated after the image is received by the computer system implementing the method, and that such processing is substantially completed before the next image is received. However, in various alternative implementations, processing of consecutive images may overlap in time (e.g., may be performed by different threads or processes that are running on one or more processors). Alternatively, two or more images may be buffered and processed asynchronously with respect to receiving the other images of a plurality of images received by the computer system implementing the method.

In some embodiments, two consecutive images of the series may be non-overlapping.

Yet in some embodiments, two consecutive images of the series may be at least partially overlapping.

In some embodiments, images of the series may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters.

The image called "the current image" further in the text is referred as "i-th image" in FIG. 2.

At block 210, the computer system implementing the method may receive the current image (of the series of images) of a copy of a patterned document. The current image may be acquired for example, by a camera. In some embodiments, the camera may be an integral part of the computer system. Yet in some embodiments, the camera may be a separate device, which is configured to transfer images to the computer system.

At block 215, the computer system may perform an optical character recognition of the current image, thereby producing OCR results, i.e. a recognized text (OCR text) and corresponding layout information, which may include coordinates for each symbol of the recognized text. The layout information may associate one or more symbols of the recognized text and/or one or more groups of symbols of the recognized text.

At block 220, the computer system may identify one or more matching textual artifacts, such as one or more symbols and one or more groups of symbols, in the OCR results for the current image and a template of the patterned document, which may be stored in a memory of the computer system. A textual artifact may be represented by a sequence of symbols (e.g., words) having a low frequency of occurrence within the OCR produced text (e.g., the frequency that does not exceed a specified frequency threshold, which may be set to 1 to reference a unique sequence of symbols). In an illustrative example, a low frequency word may be identified by sorting the OCR-produced words in the order of their respective frequencies and selecting a word having the lowest frequency. In certain implementations, only sequences of symbols, the respective lengths of which exceed a certain threshold length may be utilized by the method, since shorter sequences of symbols produce less reliable base points.

At block 225, the computer system may employ the layout information associated with the identified textual artifacts to identify at least one base point representing each textual artifact within each image of the series/template pair. In an illustrative example, a base point associated with the identified sequence of symbols may be represented by the center of the minimum bounding rectangle of the sequence of symbols. In another illustrative example, two or more base points associated with the identified sequence of symbols may be represented by the corners of the minimum bounding rectangle of the sequence of symbols.

At block 230, the computer system may inspect the identified base points and discard at least some of them in view of the chosen filtering criteria. Filtering of base points is disclosed, for example, in U.S. patent applications Ser. Nos. 15/168,548 and 15/168,525, including FIGS. 2A-2B, 3 and 4 as well as the corresponding text, which is incorporated herein by reference in its entirety.

At block 235, the computer system may construct the coordinate transformation converting coordinates of the current image into coordinates of the template. The present method assumes that, at least for the chosen pairs of each image of the series/template, coordinates of an arbitrary chosen point in the first image may be produced by applying a projective transformation to the coordinates of the same point in the second image.

"Projective transformation" herein refers to a transformation that maps lines to lines, but does not necessarily preserve parallelism. A projective transformation can be expressed by the following equations:

$$X = \frac{Ax_1 * x + Ax_2 * y + Ax_3}{Ax_4 * x + Ay_4 * y + 1} \quad (1)$$

$$Y = \frac{Ay_1 * x + Ay_2 * y + Ay_3}{Ax_4 * x + Ay_4 * y + 1} \quad (2)$$

wherein (x,y) and (X,Y) represent coordinates of an arbitrary chosen point in the first image (current image) and the second image (template), respectively. The transformation coefficients $Ax_1, Ax_2, Ax_3, Ax_4, Ay_1, Ay_2, Ay_3$, and $Ay_4$ may be determined based on known coordinates of at least four base points in each of the two images, which would produce a system of eight equations with eight variables. Once the transformation coefficients have been determined, the equations (1) and (2) may be applied to coordinates of an arbitrary chosen point in the first image in order to determine coordinates of the same point in the second image.

In certain implementations, more than four pair of base points may be identified for a given pair of each image of series/template by operations referenced by blocks 225-230, in which case the over-determined system may be resolved by regression analysis methods, such as the method of least squares. Coordinates transformations between images using base points are disclosed, example, in U.S. patent applications Ser. Nos. 15/168,548 and 15/168,525, including FIG. 5A as well as the corresponding text, which is incorporated herein by reference in its entirety.

At block 240, the computer system may overlay the template over the current image (converted into the coordinates of the template) to identify one or more textual fragments, which correspond to one or more information fields of the patterned document. This way, the computer system may discard a static portion (i.e. a portion, which corresponds to one or more static elements of the patterned document) of the current image, while forming from the text fragment's portion, which corresponds to one or more information fields of the current image, a data stack, which may include one or more symbol sequences, such as a word.

At block 245, the computer may associate one or more symbol sequences, such as a word, within the textual fragment's portion, which corresponds to one or more information fields of the current image, with a cluster of matching symbol sequences produced by OCR of the previously processed images. Association of a symbol sequence with a cluster of matching symbol sequences is disclosed, for example, in U.S. patent applications Ser. Nos. 15/168,548 and 15/168,525, see e.g. FIGS. 5A-5B, 6 as well as the corresponding text, which is incorporated herein by reference in its entirety. Preferably, the computer system associates each symbol sequence, such as a word, within the textual fragment's portion, which corresponds to one or more information fields of the current image, with a cluster of matching symbol sequences produced by OCR of the previously processed images.

At block 250, the computer system may increment a counter for the current image in the series of images. Operations of block 250 are presented in FIG. 2 for readability of the associated description, and may be omitted in various implementations of the method.

At block 255, the computer system may determine whether there is a next image in the series of images. If so, the method may loop back to block 210.

At block 260, the computer system may identify a median string for a cluster of matching symbol sequences, which corresponds to an information field of the processed copy of the patterned document, such that the identified median string would represent the OCR results for the series of images of the processed copy of the patterned document for a fragment of the document, which corresponds to the information field. Identification of median strings for clusters of matching symbol sequences is disclosed, for example, in U.S. patent applications Ser. Nos. 15/168,548 and 15/168,525, see e.g. FIGS. 7A-C as well as the corresponding text, which is incorporated herein by reference in its entirety. Preferably, the computer system identifies a median string for each cluster of matching symbol sequences, which correspond to a particular information field of the processed copy of the patterned document, while doing so for each information field of the patterned document.

If a particular information field has several, i.e. more than one, symbol sequences, such as words, (for example, a home address information field may comprise several words) and then at block 265, the computer system may identify an order, in which the symbol sequences representing the above-mentioned clusters (the median strings of clusters) should appear in the resulting text, which corresponds to the information field. For example, the images representing the original document may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters. Therefore, the texts produced by the OCR of each individual image may differ by one or more words being present or absent in each OCR result, by variations in the symbol sequences representing the words of the original text, and/or by the order of the symbol sequences.

In certain implementations, the computer system may compare a plurality of permutations of the symbol sequences that represent the identified clusters. The median permutation may be identified as the permutation having the minimal sum of Kendall tau distances to all other permutations. The Kendall tau distance between a first permutation and a second permutation may be equal to the minimum number of swapping operations required by the bubble sort algorithm to transform the first permutation into the second permutation. Identification of an order for clusters is disclosed, for example, in U.S. patent applications Ser. Nos. 15/168,548 and 15/168,525, which is incorporated herein by reference in its entirety.

In various implementations, the operations described by blocks 260 and 265 may be performed in the reverse sequence or in parallel. Alternatively, certain implementations may omit certain operations described by blocks 260 and/or 265.

At block 270, the computer system may produce a resulting OCR text, which corresponds to a particular information field of the patterned document. Preferably, the computer system produces a resulting OCR text for each information field of the patterned document. If a particular information field has only one symbol sequence, such a word, then the computer system may produce the resulting OCR text for such field directly from the median string identified in block 260. If a particular information field has several, i.e. more than one, symbol sequences, such as words, then the computer system may produce the resulting OCR text for such field after identifying an order for the corresponding symbol sequences at block 265.

Method Two

In another embodiment, an OCR method may involve a) comparing or matching OCR results for a series of images of a copy of a patterned document to obtain an aligned stack of OCR results for the series; and b) comparing or matching the aligned stack of the OCR results for the series in coordinates of the last image of the series with a template of the patterned document (a template overlaying) and identifying the best (the most accurate) OCR result of the series of images using a median string and a median permutation for each information field of the patterned document.

FIG. 3 schematically illustrates series of images 302, 304 and 306 of a copy of a patterned document. OCR results of image 304 is compared/matched (322) with OCR results of image 302, while OCR results of image 306 is compared/ matched (324) with OCR results of image 304. As the result of such comparing/matching, aligned stack 312 is obtained. Aligned stack 312 is compared/matched (342) with template 332 of the patterned document to identify the best (the most accurate) OCR result of the series of images using a median string a median permutation for information field B (334) of the patterned document.

FIG. 4 presents a flow chart of another illustrative example of a method for optical character recognition for a series of images of a patterned document. The method and/or each of its individual functions, routines, subroutines, or operations may be performed by one or more processors of a computer system executing the method. In some embodiments, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

For clarity and conciseness, the present description assumes that the processing of each image of a patterned document is initiated after the image is received by the computer system implementing the method, and that such processing is substantially completed before the next image is received. However, in various alternative implementations, processing of consecutive images may overlap in time (e.g., may be performed by different threads or processes that are running on one or more processors). Alternatively, two or more images may be buffered and processed asynchronously with respect to receiving the other images of a plurality of images received by the computer system implementing the method.

In some embodiments, images of the series may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters. The two images are individually referenced herein as "the current image" (also referred to as "i-th image" in FIG. 4) and "the previous image" (also referred to as "(i-1)-th image" in FIG. 4).

Overall, steps 410-450 are substantially identical to steps 110-150 disclosed in U.S. patent applications Ser. Nos. 15/168,548 and 15/168,525, see e.g. FIG. 1 as well as the corresponding text, which is incorporated herein by reference in its entirety.

At block 410, the computer system implementing the method may receive a current image of series of images for a copy of a patterned document. The patterned document may include one or more static elements and one or more information fields. The current image may be acquired for example, by a camera. In some embodiments, the camera may be an integral part of the computer system. Yet in some embodiments, the camera may be a separate device, which is configured to transfer acquired images to the computer system.

At block 415, the computer system may perform an optical character recognition of the current image, thereby producing OCR results, i.e. a recognized text (OCR text) and corresponding layout information, which may include coordinates for each symbol of the recognized text.

At block 420, the computer system may identify matching textual artifacts in the OCR results representing the pair of images, which may be, for example, the current image and the previous image. A textual artifact may be represented by a sequence of symbols (e.g., words) having a low frequency of occurrence within the OCR produced text (e.g., the frequency that does not exceed a specified frequency threshold, which may be set to 1 to reference a unique sequence of symbols). In an illustrative example, a low frequency word may be identified by sorting the OCR-produced words in the order of their respective frequencies and selecting a word having the lowest frequency. In certain implementations, only sequences of symbols, the respective lengths of which exceed a certain threshold length may be utilized by the method, since shorter sequences of symbols produce less reliable base points.

At block 425, the computer system may employ the layout information, such as coordinates, associated with the identified textual artifacts to identify at least one base point representing each textual artifact within each image of the pair of images. In an illustrative example, a base point associated with the identified sequence of symbols may be represented by the center of the minimum bounding rectangle of the sequence of symbols. In another illustrative example, two or more base points associated with the identified sequence of symbols may be represented by the corners of the minimum bounding rectangle of the sequence of symbols.

At block 430, the computer system may inspect the identified base points and discard at least some of them in view of the chosen filtering criteria. In an illustrative example, the computer system may verify that arbitrarily selected groups of the matching base points exhibit certain geometric features that are invariant with respect to the chosen images. Filtering of base points is disclosed, for example, in U.S. patent applications Ser. Nos. 15/168,548 and 15/168,525, see e.g. FIGS. 2A-2B, 3 and 4 as well as the corresponding text, which is incorporated herein by reference in its entirety.

At block 435, the computer system may construct a coordinate transformation converting coordinates of one image of the pair of images into coordinates of another image of the pair of images. The present method assumes that, at least for the chosen pairs of images, coordinates of an arbitrary chosen point in the first image may be produced by applying a projective transformation to the coordinates of the same point in the second image.

Preferably, the computer system constructs a coordinate transformation converting coordinates of the previous image into coordinates of the current image.

"Projective transformation" herein refers to a transformation that maps lines to lines, but does not necessarily preserve parallelism. A projective transformation can be expressed by the following equations:

$$X = \frac{Ax_1 * x + Ax_2 * y + Ax_3}{Ax_4 * x + Ay_4 * y + 1} \quad (1)$$

$$Y = \frac{Ay_1 * x + Ay_2 * y + Ay_3}{Ax_4 * x + Ay_4 * y + 1} \quad (2)$$

wherein (x,y) and (X,Y) represent coordinates of an arbitrary chosen point in the first image and the second image, respectively. The transformation coefficients $Ax_1$, $Ax_2$, $Ax_3$, $Ax_4$, $Ay_1$, $Ay_2$, $Ay_3$, and $Ay_4$ may be determined based on known coordinates of at least four base points in each of the two images, which would produce a system of eight equations with eight variables. Once the transformation coefficients have been determined, the equations (1) and (2) may be applied to coordinates of an arbitrary chosen point in the first image in order to determine coordinates of the same point in the second image.

In certain implementations, more than four pair of base points may be identified for a given pair of images by operations referenced by blocks 425-430, in which case the over-determined system may be resolved by regression analysis methods, such as the method of least squares.

Projective transformations are disclosed, for example, in U.S. patent applications Ser. Nos. 15/168,548 and 15/168,525, including FIG. 5A as well as the corresponding text, which is incorporated herein by reference in its entirety.

At block 440, the computer system may associate one or more symbol sequences produced by OCR of the current image with one or more clusters of matching symbol sequences produced by OCR of the previously processed images. The computer system may employ the above-referenced coordinate transformations to compare positions of recognized symbol sequences in the current and previous images, and thus identify groups of symbol sequences that are likely to represent the same fragment of the original document. Association of a symbol sequence with a cluster of matching symbol sequences is disclosed, for example, in U.S. patent applications Ser. Nos. 15/168,548 and 15/168,525, including FIGS. 5A-5B, 6 as well as the corresponding text, which is incorporated herein by reference in its entirety.

At block 445, the computer system may increment the counter for the current image in the series of images. Notably, operations of block 445 are presented in FIG. 4 for readability of the associated description, and may be omitted in various implementations of the method.

At block 450, the computer system may determine whether there is a next image; if so, the method may loop back to block 410.

At block 455, the computer system may construct a coordinate transformation converting coordinates of the last image in the series of images into coordinates of a template of the patterned document. Such transformation converts one or more clusters of matching symbol sequences, which were formed by processing all the images of the series, into the coordinates of the template.

The coordinate transformation at block 455 may performed similarly to the coordinate transformation at block 435.

At block 460, the computer system may identify a cluster of symbol sequences which corresponds to a particular information field in the processed copy of the patterned document from the one or more clusters of matching symbol sequences by comparing the one or more clusters in the coordinates of the template with the template itself At block 465, the computer system may identify a median string for a cluster of symbol sequences, which corresponds to a particular information field of the processed copy of the patterned document, such that the identified median string would represent the OCR result for a fragment of the current image, which corresponds to the information field. Identification of median strings for clusters of symbol sequences is disclosed, for example, in U.S. patent applications Ser. Nos. 15/168,548 and 15/168,525, see e.g. FIGS. 7A-C as well as the corresponding text, which is incorporated herein by reference in its entirety. Preferably, the computer system identifies a median string for each cluster of matching symbol sequences, which correspond to a particular information field of the processed copy of the patterned document, while doing so for each information field of the patterned document.

If a particular information field has several, i.e. more than one, symbol sequences, such as words, (for example, a home address information filed may comprise several, i.e. more than one words) then at block 470, the computer system may identify an order, in which the symbol sequences representing the above-mentioned clusters (the median strings of clusters) should appear in the resulting text, which corresponds to the information field. For example, the images representing the original document may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters. Therefore, the texts produced by the OCR of each individual image may differ by one or more words being present or absent in each OCR result, by variations in the symbol sequences representing the words of the original text, and/or by the order of the symbol sequences.

In certain implementations, the computer system may compare a plurality of permutations of the symbol sequences that represent the identified clusters. The median permutation may be identified as the permutation having the minimal sum of Kendall tau distances to all other permutations. The Kendall tau distance between a first permutation and a second permutation may be equal to the minimum number of swapping operations required by the bubble sort algorithm to transform the first permutation into the second symbol permutation. Identification of an order for clusters is disclosed, for example, in U.S. patent applications Ser. Nos. 15/168,548 and 15/168,525, see e.g. FIG. 5B as well as the corresponding text, which is incorporated herein by reference in its entirety.

In various implementations, the operations described by blocks 465 and 470 may be performed in the reverse sequence or in parallel. Alternatively, certain implementations may omit certain operations described by blocks 465 and/or 470.

At block 475, the computer system may produce a resulting OCR text, which corresponds to a particular information field of the processed copy of the patterned document. Preferably, the computer system produces a resulting OCR text for each information field for the processed copy of the patterned document. If a particular information field has only one symbol sequence, such a word, then the computer system may produce the resulting OCR text for such field directly from the median string identified in block 465. If a particular information field has several, i.e. more than one, symbol sequences, such as words, then the computer system may produce the resulting OCR text for such field after identifying an order for the corresponding symbol sequences at block 470.

At least one advantage of the method, which is illustrated in FIG. 2, is that it allows for a better identification of objects due to a lower error in coordinate transformation calculation.

At least one advantage of the second method, which is illustrated in FIG. 4, is its higher reliability. Individual images contain more text than a template. Thus, a successful recognition of some static elements in at least one image of the series may guarantee a successful overlaying with the template even if the same static elements are not well recognized in many of other images of the series.

The computer system may be, for example, a computer system, which is illustrated in FIG. 6. The computer system may be a device capable of executing a set of instructions (sequential or otherwise) that specify operations to be performed by that computer system. For example, a personal computer (PC), a tablet PC, a set-top box (STB), a Personal Digital Assistant (PDA), or a cellular telephone.

FIG. 6 depicts a component diagram of an example computer system 600 within which a set of instructions, for causing the computer system to perform any one or more of the methods discussed herein, may be executed. The computer system 600 may be connected to other computer system in a LAN, an intranet, an extranet, or the Internet. The computer system 600 may operate in the capacity of a server or a client computer system in client-server network environment, or as a peer computer system in a peer-to-peer (or distributed) network environment. The computer system 600 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 600 includes processor 602, main memory 604 (e.g., read-only memory (ROM) or dynamic random access memory (DRAM)), and data storage device 618, which communicate with each other via bus 630.

Processor 602 may be represented by one or more general-purpose processing devices such as a microprocessor, central processing unit, or the like. More particularly, processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute instructions 626 for performing the operations and functions of one of the methods of FIG. 2 or FIG. 4.

Computer system 600 may further include network interface device 622, video display unit 610, a character input device 612 (e.g., a keyboard), and touch screen input device 614.

Data storage device 618 may include a computer-readable storage medium 624 on which is stored one or more sets of instructions 626 embodying any one or more of the methods or functions described herein. Instructions 626 may also reside, completely or at least partially, within main memory 604 and/or within processor 602 during execution thereof by computer system 600, main memory 604 and processor 602 also constituting computer-readable storage media. Instructions 626 may further be transmitted or received over network 616 via network interface device 622.

In certain implementations, instructions 626 may include instructions for performing one or more functions of methods illustrated in FIGS. 2 and 4. While computer-readable storage medium 624 is shown in the example of FIG. 6 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. It is to be understood that the above description is intended to be illustrative, and not restrictive.

Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   (a) receiving, by a processing device of a computer system, a current image of a series of images of a copy of a patterned document, wherein the patterned document has at least one static element and at least one information field;
   (b) performing optical character recognition (OCR) of the current image to produce an OCR text and corresponding coordinates for each symbol of the OCR text;
   (c) identifying parameters of a coordinate transformation to transform coordinates of the current image into coordinates of a template, wherein the template contains i) a text and coordinates for the at least one static element of the patterned document and ii) coordinates for the at least one information field of the patterned document;
   (d) identifying in the OCR text for the current image in the coordinates of the template a text fragment that corresponds to an information field of the at least one information field;
   (e) associating in the coordinates of the template the text fragment that corresponds to the information field with one or more clusters of symbol sequences, wherein the text fragment is produced by processing the current image and wherein the symbol sequences are produced by processing one or more previously received images of the series of images;
   (f) producing, for each cluster of the one or more clusters, a median string representing the cluster of symbol sequences for the information field; and
   (g) producing, using the median string of each of the one or more clusters, a resulting OCR text that represents an original text of the information field of the copy of the patterned document.

2. The method of claim 1, further comprising:
   identifying, using the OCR text produced in b), a plurality of textual artifacts in each of the current image and the template, wherein each textual artifact is represented by a sequence of symbols that has a frequency of occurrence within the OCR text falling below a threshold frequency;
   identifying, in each of the current image and the template, a corresponding plurality of base points, wherein each base point is associated with at least one textual artifact of the plurality of textual artifacts; and wherein said identifying the parameters of the coordinate transformation uses coordinates of matching base points in the current image and the template.

3. A method, comprising:
(a) receiving, by a processing device of a computer system, a current image of a series of images of a copy of a patterned document, wherein the current image at least partially overlaps with a previous image of the series of images and the patterned document has at least one static element and at least one information field;
(b) performing optical symbol recognition (OCR) of the current image to produce an OCR text and corresponding coordinates for each symbol of the OCR text;
(c) identifying parameters of a coordinate transformation to transform coordinates of the previous image into coordinates of the current image;
(d) associating at least part of the OCR text with one or more clusters of symbol sequences, wherein the OCR text is produced by processing the current image and wherein the symbol sequences are produced by processing one or more previously received images of the series of images;
(e) identifying parameters of a coordinate transformation to transform the coordinates of the current image of the series of images, into coordinates of a template of the patterned document, wherein the template contains i) a text and coordinates for the at least one static element of the patterned document and ii) coordinates for the at least one information field of the patterned document;
(f) identifying in the coordinates of the template, one or more clusters of symbol sequences that corresponds to an information field of the at least one information field;
(g) producing, for each of the one or more clusters that corresponds to the information field, a median string representing the cluster of symbol sequences for the information field; and
(h) producing, using the median string of each of the one or more clusters, a resulting OCR text that represents an original text of the information field of the copy of the patterned document.

4. The method of claim 3, further comprising:
identifying, using the OCR text produced in b), a plurality of textual artifacts in each of the current image and the previous image, wherein each textual artifact is represented by a sequence of symbols that has a frequency of occurrence within the OCR text falling below a threshold frequency;
identifying, in each of the current image and the previous image, a corresponding plurality of base points, wherein each base point is associated with at least one textual artifact of the plurality of textual artifacts; and
wherein said identifying the parameters of the coordinate transformation uses coordinates of matching base points in the current image and the previous image.

5. The method of claim 2 or 4, wherein the identifying the plurality of textual artifacts further comprises determining a center of a minimum bounding rectangle of an associated textual artifact.

6. The method of claim 2 or 4, further comprising filtering the identified base points using invariant geometric features of base point groupings.

7. The method of claim 1 or 3, wherein the coordinate transformation is a projective transformation.

8. The method of claim 1 or 3, wherein the median string has a minimal sum of values of a pre-defined metric with respect to the cluster of symbol sequences.

9. The method of claim 8, wherein the pre-defined metric represents an edit distance between the median string and a symbol sequence of the plurality of symbol sequences.

10. The method of claim 1 or 3, wherein said producing the median string comprises applying weight coefficients to each symbol sequence of the cluster of symbol sequences.

11. The method of claim 3, wherein the current image and the previous image represent consecutive images of the series of images.

12. The method of claim 3, wherein the current image and the previous image differ in at least one of: image scale, a shooting angle, image brightness, or presence of an external object that is covering at least part of the copy of the document.

13. The method of claim 1 or 3, wherein the associating with the one or more clusters of symbol sequences further comprises identifying an order of plural clusters.

14. The method of claim 13, wherein the identifying the order of the plural clusters comprises identifying a median of permutations of the clusters.

15. The method of claim 14, wherein the median of the permutations of the clusters has a minimal sum of Kendall tau distances to all other permutations.

16. The method of claim 1 or 3, further comprising acquiring the series of images by a camera and transferring the series of images to the processing device.

17. The method of claim 1 or 3, further displaying the resulting OCR text on the display of the computer system.

18. The method of claim 1 or 3, further comprising providing instructions to a user of the computer system for acquiring a next image of the series.

19. The method of claim 1 or 3 further comprising transferring the resulting OCR text into a database.

20. A system, comprising:
A) a memory configured to store a template of a patterned document, which comprises at least one static element and at least one information field, wherein the template contains i) a text and coordinates for the at least one static element of the patterned document and ii) coordinates for the at least one information field of the patterned document;
B) a processing device, coupled to the memory, the processing device configured to:
(a) receive a current image of a series of images of a copy of the patterned document;
(b) perform optical character recognition (OCR) of the current image to produce an OCR text and corresponding coordinates for each symbol of the OCR text;
(c) identify parameters of a coordinate transformation to transform coordinates of the current image into coordinates of the template;
(d) identify in the OCR text for the current image in the coordinates of the template a text fragment that corresponds to an information field of the at least one information field;
(e) associate in the coordinates of the template the text fragment that corresponds to the information field with one or more clusters of symbol sequences, wherein the text fragment is produced by processing the current image and wherein the symbol sequences are produced by processing one or more previously received images of the series of images;
(f) produce, for each cluster of the one or more clusters, a median string representing the cluster of symbol sequences for the information field; and (g) produce, using the median string of each of the one or more clusters, a resulting OCR text that represents an original text of the information field of the copy of the patterned document.

21. A system, comprising:

A) a memory configured to store a template of a patterned document, which comprises at least one static element and at least one information field, wherein the template contains i) a text and coordinates for the at least one static element of the patterned document and ii) coordinates for the at least one information field of the patterned document;

B) a processing device, coupled to the memory, the processing device configured to:
(a) receive a current image of a series of images of a copy of the patterned document;
(b) perform optical symbol recognition (OCR) of the current image to produce an OCR text and corresponding coordinates for each symbol of the OCR text;
(c) identify parameters of a coordinate transformation to transform coordinates of the previous image into coordinates of the current image;
(d) associate at least part of the OCR text with one or more clusters of symbol sequences, wherein the OCR text is produced by processing the current image and wherein the symbol sequences are produced by processing one or more previously received images of the series of images;
(e) identify parameters of a coordinate transformation to transform the coordinates of the current image of the series of images, into coordinates of the template;
(f) identify in the coordinates of the template, one or more clusters of symbol sequences that corresponds to an information field of the at least one information field;
(g) produce, for each of the one or more clusters that corresponds to the information field, a median string representing the cluster of symbol sequences for the information field; and
(h) produce, using the median string of each of the one or more clusters, a resulting OCR text that represents an original text of the information field of the copy of the patterned document.

22. The system of claim 20 or 21, further comprising a camera configured to acquire the series of images and to transfer the series of images to the processing device.

23. The system of claim 21, further comprising:
a mobile device comprising the memory and the processing device.

24. A computer-readable non-transitory storage medium comprising executable instructions that, when executed by a processing device, cause the processing device to:
(a) receive a current image of a series of images of a copy of a patterned document, wherein the patterned document has at least one static element and at least one information field;
(b) perform optical character recognition (OCR) of the current image to produce an OCR text and corresponding coordinates for each symbol of the OCR text;
(c) identify parameters of a coordinate transformation to transform coordinates of the current image into coordinates of a template, wherein the template contains i) a text and coordinates for the at least one static element of the patterned document and ii) coordinates for the at least one information field of the patterned document;
(d) identify in the OCR text for the current image in the coordinates of the template a text fragment that corresponds to an information field of the at least one information field;
(e) associate in the coordinates of the template the text fragment that corresponds to the information field with one or more clusters of symbol sequences, wherein the text fragment is produced by processing the current image and wherein the symbol sequences are produced by processing one or more previously received images of the series of images;
(f) produce, for each cluster of the one or more clusters, a median string representing the cluster of symbol sequences for the information field; and
(g) produce, using the median string of each of the one or more clusters, a resulting OCR text that represents an original text of the information field of the copy of the patterned document.

25. A computer-readable non-transitory storage medium comprising executable instructions that, when executed by a processing device, cause the processing device to:
(a) receive a current image of a series of images of a copy of a patterned document, wherein the current image at least partially overlaps with a previous image of the series of images and the patterned document has at least one static element and at least one information field;
(b) perform optical symbol recognition (OCR) of the current image to produce an OCR text and corresponding coordinates for each symbol of the OCR text;
(c) identify parameters of a coordinate transformation to transform coordinates of the previous image into coordinates of the current image;
(d) associate at least part of the OCR text with one or more clusters of symbol sequences, wherein the OCR text is produced by processing the current image and wherein the symbol sequences are produced by processing one or more previously received images of the series of images;
(e) identify parameters of a coordinate transformation to transform the coordinates of the current image of the series of images, into coordinates of a template of the patterned document, wherein the template contains i) a text and coordinates for the at least one static element of the patterned document and ii) coordinates for the at least one information field of the patterned document;
(f) identify in the coordinates of the template, one or more clusters of symbol sequences that corresponds to an information field of the at least one information field;
(g) produce, for each of the one or more clusters that corresponds to the information field, a median string representing the cluster of symbol sequences for the information field; and
(h) produce, using the median string of each of the one or more clusters, a resulting OCR text that represents an original text of the information field of the copy of the patterned document.

* * * * *